United States Patent
Bryant et al.

(10) Patent No.: US 6,785,075 B2
(45) Date of Patent: Aug. 31, 2004

(54) SELF-WRITING SERVO AND CLOCK FIELDS ON A RECORDING MEDIUM

(75) Inventors: Lawrence M. Bryant, Palo Alto, CA (US); Gabor Szita, Newark, CA (US); Alan A. Fennema, San Jose, CA (US); Karl A. Belser, San Jose, CA (US); Robert D. Murphy, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 292 days.

(21) Appl. No.: 09/915,935

(22) Filed: Jul. 26, 2001

(65) Prior Publication Data

US 2002/0048107 A1 Apr. 25, 2002

Related U.S. Application Data

(60) Provisional application No. 60/242,780, filed on Oct. 24, 2000, and provisional application No. 60/263,038, filed on Jan. 18, 2001.

(51) Int. Cl.[7] ............................ G11B 5/09; G11B 5/596
(52) U.S. Cl. .............................. 360/51; 360/53; 360/75; 360/77.08; 360/77.07; 360/77.06; 360/78.09; 360/78.04; 360/78.14
(58) Field of Search ......................... 360/51, 46, 77.08, 360/78.01, 78.08, 78.09, 78.14, 75, 53, 77.05, 77.02, 77.04, 77.07, 78.04, 77.06

(56) References Cited

U.S. PATENT DOCUMENTS

| | | | |
|---|---|---|---|
| 4,414,589 A | | 11/1983 | Oliver et al. |
| 4,912,576 A | * | 3/1990 | Janz .................... 360/77.07 |
| 5,170,299 A | | 12/1992 | Moon |
| 5,448,429 A | * | 9/1995 | Cribbs et al. ................ 360/75 |
| 5,485,322 A | | 1/1996 | Chainer et al. |
| 5,612,833 A | | 3/1997 | Yarmchuk et al. |
| 5,615,058 A | * | 3/1997 | Chainer et al. ............. 360/51 |
| 5,757,574 A | * | 5/1998 | Chainer et al. ............. 360/75 |
| 5,844,742 A | | 12/1998 | Yarmchuk et al. |
| 5,862,005 A | | 1/1999 | Leis et al. |
| 5,875,064 A | * | 2/1999 | Chainer et al. ............. 360/75 |
| 5,907,447 A | | 5/1999 | Yarmchuk et al. |
| 5,909,333 A | | 6/1999 | Best et al. |
| 5,991,115 A | | 11/1999 | Chainer et al. |
| 6,005,738 A | | 12/1999 | Chainer et al. |
| 6,031,680 A | | 2/2000 | Chainer et al. |
| 6,075,668 A | | 6/2000 | Chainer et al. |
| 6,078,450 A | | 6/2000 | Chainer et al. |
| 6,101,055 A | | 8/2000 | Chainer et al. |
| 6,101,063 A | | 8/2000 | Chainer et al. |
| 6,108,153 A | * | 8/2000 | Glover ........................ 360/51 |
| 6,172,830 B1 | * | 1/2001 | Leonard ...................... 360/51 |
| 6,307,696 B1 | * | 10/2001 | Bishop et al. ............... 360/51 |

FOREIGN PATENT DOCUMENTS

| | | |
|---|---|---|
| WO | WO 98/31015 | 7/1998 |
| WO | WO 01/52260 A1 | 7/2001 |
| WO | WO 01/67452 | 9/2001 |
| WO | WO 01/67453 | 9/2001 |
| WO | WO 01/67454 A1 | 9/2001 |

OTHER PUBLICATIONS

IBM Corporation, "Regenerative Clock Technique For Servo Track Writers," IBM Technical Disc. Bulletin, vol. 33 (No. 5), p. 310, 311, (Oct. 3, 1990).

* cited by examiner

Primary Examiner—David Hudspeth
Assistant Examiner—Natalia Figueroa
(74) Attorney, Agent, or Firm—Fellers, Snider, et al.

(57) ABSTRACT

A disc drive with an information portion previously written on a rotatable disc surface, a servo write clock generator phase lock loop circuit controlling timing for writing a reference mark to the rotatable disc surface in substantial time alignment and phase and frequency coherent with the information portion previously written to the rotatable disc surface, a servo write clock generator phase lock loop circuit controlling timing for writing the reference mark, a pulse detector circuit for creating logic level signals from the reference mark, a pattern generator for generating reference mark write signals from the logic level signals, a memory buffer for storing radial position correction tables and values for writing the reference mark, and a self-servo control and sequencing circuit synchronizing timing signals for writing the reference mark to rotatable disc surface of disc drive.

17 Claims, 7 Drawing Sheets

SELF-WRITING SERVO AND CLOCK FIELDS ON A RECORDING MEDIUM

RELATED APPLICATIONS

This application claims priority to U.S. Provisional Application Ser. No. 60/242,780 filed Oct. 24, 2000, entitled, Integrated Circuit System for Hard Drive Self-Servo Write and U.S. Provisional Application Ser. No. 60/263,038 filed Jan. 18, 2001, entitled, PLL System with R/W Delay Compensation.

FIELD OF THE INVENTION

This invention relates generally to the field of magnetic data storage devices, and more particularly, but not by way of limitation, to incorporation of an integrated circuit system for self-writing servo and clock fields aligned in time and coherent in phase and frequency to servo and clock fields previously written on a disc drive.

BACKGROUND

Disc drives are used for data storage in modem electronic products ranging from digital cameras to computer systems and networks. Typically, disc drive includes a mechanical portion, or head disc assembly (HDA), and electronics in the form of a printed circuit board assembly (PCB), mounted to an outer surface of the HDA. The PCB controls HDA functions and provides an interface between the disc drive and its host.

Generally, a HDA comprises one or more magnetic discs affixed to a spindle motor assembly for rotation at a constant speed, an actuator assembly supporting an array of read/write heads that traverse generally concentric data tracks radially spaced across the disc surfaces and a voice coil motor (VCM) providing rotational motion to the actuator assembly. Modem disc drives typically utilize magneto resistive head technology that employs both an inductive element, for writing data to the data tracks and a magneto resistive element for reading data from the recording tracks.

Continued demand for disc drives with ever increasing levels of data storage capacity, faster data throughput and decreasing price per megabyte have led disc drive manufacturers to seek ways to increase the storage capacity and improve overall operating efficiencies of the disc drive. Present generation disc drives typically achieve aerial bit densities of several gigabits per square centimeter, Gbits/$cm^2$. Increasing recording densities can be achieved by increasing the number of bits stored along each track or bits per inch (BPI), generally requiring improvements in the read/write channel electronics, and/or by increasing the number of tracks per unit width or tracks per inch (TPI), generally requiring improvements in servo control systems.

Servo fields written to the surface of the disc provide positional information used by the servo control system to control position of the read/write heads relative to the rotating magnetic disc. As TPI escalate, servo field writing techniques that incorporate servo track writers are unable to provide servo fields with sufficient accuracy to support the increased track densities.

One approach taken by disc drive manufacturers to improve servo control systems has been through the introduction of self-servo writing methods. One such method is described in U.S. Pat. No. 4,912,576, issued Mar. 27, 1990 to Janz. In Janz, one side of a disc is reserved for servo and the other side for data. Janz teaches a first servo track written at an outer edge on the servo side of the disc. Transducers are moved-in radially one half of a track, as indicated by the first phase servo track amplitude, and a first data-track is recorded on the data side of the disc. The transducers are again moved-in radially one half of a track, this time as indicated by the first data-track amplitude, and a second phase servo track is recorded on the servo side.

Another approach is described in U.S. Pat. No. 4,414,589, issued Nov. 8, 1983 to Oliver, et al. This reference teaches servo writing wherein optimum track spacing is determined by positioning one of the moving read/write heads at a first limit stop in the range of travel of the positioning means. Unfortunately, the Oliver reference does not disclose how to generate a clock track using the internal recording data heads, as an external clock head achieves this.

Yet another approach is described in U.S. Pat. No. 5,612,833 issued Mar. 18, 1997 to Yarmchuk, et al. This reference teaches a method of keeping self-propagated track errors from growing during a self-servo writing process through the use of timing circuitry for adjusting the relative timing of one or more sections of the servo pattern, a pattern generator for producing write data for propagation bursts and product servo patterns, a time delay unit for making fine adjustments in relative timing of one or more sections of the written pattern, amplitude detection circuitry for measuring the readback amplitude of written transitions, a memory for storing various quantities such as the measured values of the readback amplitudes and reference track values, a divider for normalizing instantaneous readback amplitudes by their corresponding original full-track amplitudes, a microprocessor sequence controller and a servo controller having variable control parameters to allow rapid stepping and settling followed by a special form of control during the write process that limits the growth of track shape errors while substantially rejecting mechanical disturbances. The Yarmchuk reference fails to disclose servo loop measurement circuitry implementation within the disc drive, but teaches the use of a commercially available personal computer together with a commercially available data acquisition plug-in board containing timing circuitry, an ADC, and a DAC.

In still another approach disclosed in U.S. Pat. No. 6,031,680 issued Feb. 29, 2000 to Chainer, et al., a product servo pattern burst is written to a first track, a second sequential product servo pattern burst is written to a second track while servoing on a third track. However, the Chainer reference fails to teach the circuitry used to implement the disclosed self-servo writing method.

Self-servo writing as a technology is faced with many challenges. One of these challenges is the ability to write information aligned in time and coherent in phase and frequency with information previously written to the disc. Delays between the write channel and read channel cause readback information to be frequency coherent but shifted in phase relative to the write signal, which is fed to the write channel. Additionally, circuit offsets in any synchronization system whether phase locked loop (PLL) based, or otherwise, present themselves as an additional phase (or time) offset relative to the desired written information. Therefore, challenges remain and a need persists for advancing integrated circuit systems incorporated within disc drives to advance the art of disc drive self-servo writing in an economical and effective manner that overcomes the constraints present in disc drive self-servo writing technologies.

SUMMARY OF THE INVENTION

The present invention provides a disc drive with a rotatable disc surface accessed by a positionable read/write head controlled by a positioning mechanism functioning under the control of a servo control loop that includes a write channel for generating write signals for writing data to the rotatable disc surface, a previously written reference mark written to the rotatable disc surface, a servo write clock generator phase lock loop circuit controlling timing for writing a reference mark in substantial time alignment and frequency and phase coherent with the previously written reference mark, a pulse detector circuit for creating logic level signals from the previously written reference marks, a pattern generator for generating reference mark write signals from the logic level signals detected by the pulse detector circuit for use in writing the reference marks to the rotatable disc surface, a multiplexer for switching between write signals from the write channel and reference mark write signals from the pattern generator for writing information and the reference mark respectively to the rotatable disc surface of the disc drive, a memory buffer for storing radial position correction tables and values for writing the reference mark to the rotatable disc surface, and a self-servo control and sequencing circuit synchronizing timing signals for writing the reference mark to the rotatable disc surface integrated into drive electronics.

In a preferred embodiment, a method self-writing additional servo field and clock field information respectively in substantial time alignment and phase and frequency coherent with a respective previously written servo field and clock field is used to form a data track on a rotatable disc surface of a disc drive, using a read/write head of the disc drive. The steps used to write the additional servo field and clock field information respectively in substantial time alignment and phase and frequency coherent with the respective previously written servo field and clock field include, measuring a difference in radial position, relative to a center of the rotatable disc surface, between a read element and a write element of the read/write head for use in writing the information field to the rotatable disc surface; selecting a data track of the rotatable disc surface for reading the previously written information field written to the selected data track and setting an initial phase correction value, corresponding to the selected data track, to zero in preparation for writing the information field to the selected data track; positioning the read element adjacent the selected data track while obtaining a phase lock of a servo write clock generator phase lock loop circuit using the previously written information field for use in writing the information field to the selected data track in substantial alignment in time and phase and frequency coherent with the previously written information field; and writing the information field to a second data track of the rotatable disc surface substantially aligned in time and coherent in phase and frequency with the previously written information field of the selected data track, while maintaining the phase lock of the servo write clock generator phase lock loop circuit to the previously written information field.

These and various other features and advantages which characterize the present invention will be apparent from a reading of the following detailed description and a review of the associated drawings.

DETAILED DESCRIPTION

Figure 1:
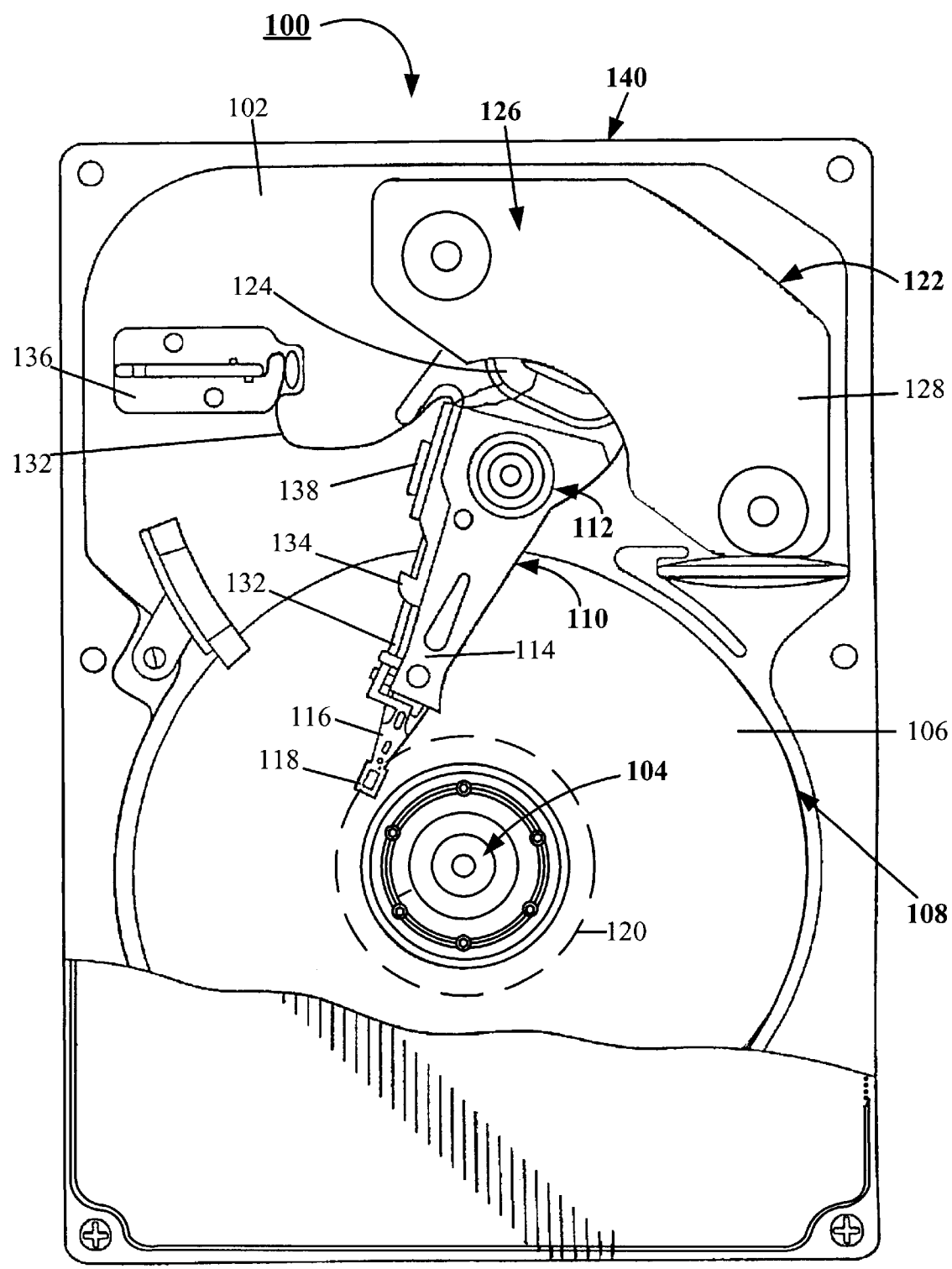
FIG. 1 is a top plan view of a disc drive incorporating an integrated circuit system for self-writing servo and clock fields on the disc drive in accordance with a method of the present invention.

Referring to the drawings in general, and more particularly to FIG. 1, shown therein is a top view of a disc drive 100 constructed in accordance with the present invention. Numerous details of and variations for the construction of the disc drive 100 are not included in the following description as such are well known to those skilled in the art and are believed to be unnecessary for the purpose of describing the present invention.

The disc drive 100 includes a basedeck 102 supporting various disc drive components including a spindle motor assembly 104. The spindle motor assembly 104 supports at least one axially aligned rotatable disc surface 106 forming a disc stack 108 (also referred to as a "disc pack"). Adjacent the disc stack 108 is an actuator assembly 110 (also referred to as an "E-block" or a head stack assembly (HSA)), which pivots about a primary actuator motor support 112 (also referred to as a "bearing assembly") in a rotary fashion. The HSA 110 includes at least one actuator arm 114 that supports a load arm 116. Each load arm 116 in turn supports at least one read/write head 118 (also referred as heads 118) that correspond to each disc surface 106. The read head portion of read/write head 118 may be physically separated or offset from the write head portion of read/write head 118 both in a radial or cross-track direction and in a circumferential or along-track direction (not shown). A relatively small head offset is a common feature of the construction of modern magneto-resistive head assemblies. In addition a self-writing servo propagation advantage may be achieved by use of a relatively large offset between the read head and the write head. Each disc surface 106 is divided into substantially concentric circular data tracks 120 (only one shown) over which the read/write heads 118 are positionably located, and on which head position control information are written to embedded servo fields (not separately shown). The embedded servo fields separate a plurality of data sectors (not separately shown) for use by customers to store data.

The HSA 110 is controllably positioned by a primary actuator motor 122 (also referred to as a "voice coil motor assembly" (VCM)), comprising an actuator coil 124 immersed in the magnetic field generated by a magnet assembly 126. A magnetically permeable flux path is provided by a steel plate 128 (also called a top pole piece) mounted above the actuator coil 124 to complete the magnetic circuit of the VCM 122. During operation of the disc drive 100, and under the control of a servo control loop (not shown) current is passed through the coil 124, an electromagnetic field is setup, which interacts with the magnetic circuit of the VCM 122 to cause the actuator coil 124 to move relative to the magnet assembly 126 in accordance with the well-known Lorentz relationship. As the actuator coil 124 moves, the HSA 110 pivots about the bearing assembly 112 (also referred to as a primary actuator motor support), thereby controlling the position of the heads 118 relative to a selected data track 120 of the disc surfaces 106. The servo control loop (not shown) is an element of servo system 130 (not separately shown) that also includes a positioning mechanism (not shown separately). The positioning mechanism includes the HSA 110 and the VCM 122. The servo control loop (not shown) includes servo control code programmed into a servo control circuit (not shown)

To provide the requisite electrical conduction paths between the read/write heads 118 and disc drive read/write circuitry (not shown), read/write head wires (not separately shown) are affixed to a read/write flex circuit 132. Next, the read/write flex circuit 132 is routed from the load arms 116 along the actuator arms 114 and into a flex circuit containment channel 134, then on to a flex connector body 136. The flex connector body 136 supports the flex circuit 132 during passage of the read/write flex circuit 132 through the basedeck 102 and into electrical communication with a disc drive printed circuit board assembly (PCBA) (also referred to as an electronic control system) (not shown) mounted to the underside of the basedeck 102. The flex circuit containment channel 134 also supports read/write signal circuitry including preamplifier/driver (preamp) 138 used to condition read/write signals passed between the read/write circuitry (not shown) and the read/write heads 118. The electronic control system provides the disc drive read/write circuitry, which controls the operation of the heads 118, as well as other interface and control circuitry for the disc drive 100.

The disc drive 100 has two primary assemblies, the PCBA (not shown) and a head disc assembly (HDA) 140 attached to the PCBA. Typically included within the HDA 140 are the HSA 110, the VCM 122 and the disc pack 108.

Figure 2:
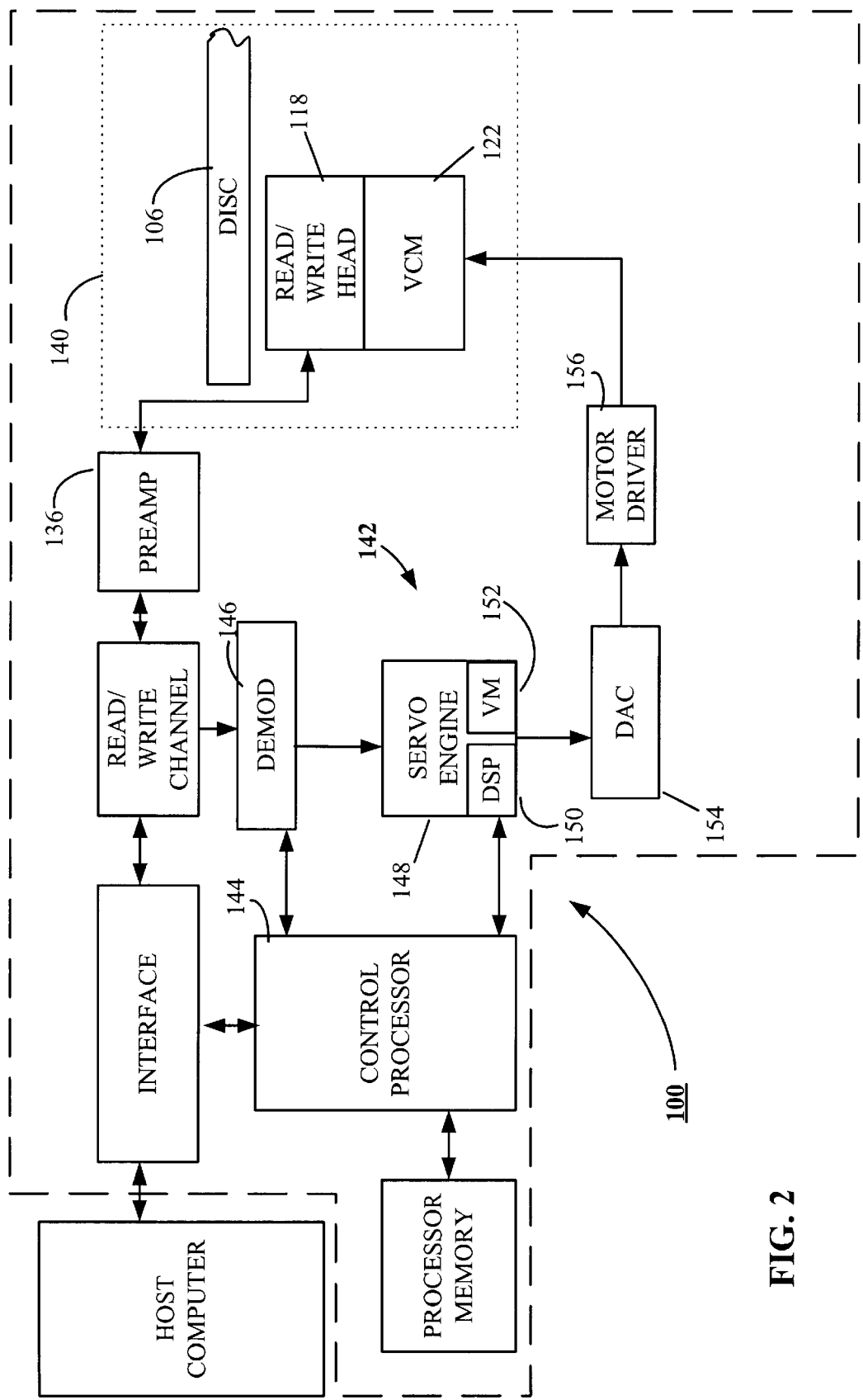
FIG. 2 is a simplified functional block diagram of a servo control loop of the disc drive of FIG. 1.

Turning to FIG. 2, positional control of the heads 118 is provided by the positioning mechanism (not separately shown) operating under the control of servo control circuit 142 programmed with servo control code, which forms the servo control loop. The servo control circuit 142 includes control processor 144, a demodulator (demod) 146, may include an application specific integrated circuit (ASIC) hardware-based servo controller ("servo engine") 148, may include a digital signal processor 150, and includes volatile memory (VM) 152, a digital to analog converter (DAC) 154 and a motor driver circuit 156. Optionally, the functions of servo engine 148, DSP 150 and volatile memory 152 may all be contained within control processor 144. The components of the control circuit 142 are utilized to facilitate track following algorithms for the HSA 110 (of FIG. 1) and more specifically for controlling the VCM 122 in attaining positioning of the heads 118 relative to the selected data track 120 (of FIG. 1).

The demodulator 146 conditions head position control information transduced from the disc 106 to provide position information of the heads 118 relative to the data track 120 (of FIG. 1). The servo engine 148 generates servo control loop values used by control processor 144 in generating command signals such as seek signals used by VCM 122 in executing seek commands, and to maintain position of the HSA 110 (of FIG. 1) during data transfer operations. The command signals are converted by the DAC 154 to analog control signals for use by the motor driver circuit 156 in directing positioning of the heads 118 relative to the selected data track 120 and seek functions of the HSA 110 (both of FIG. 1).

Figure 3:
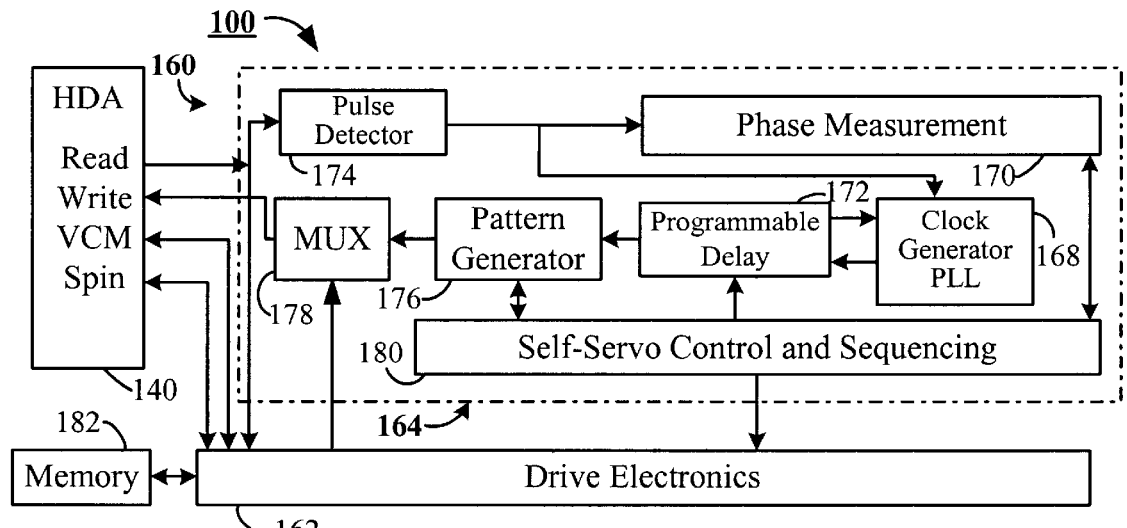
FIG. 3 provides a block diagram of an electronic control system of the disc drive of FIG. 1, showing a portion of circuitry of the electronic control system, which facilitates self-writing of servo and clock fields to the disc drive of FIG. 1.

FIG. 3 shows a functional block diagram of disc drive 100 showing HDA 140, and electronic control system 160. Included within electronic control system 160 are drive electronics 162 and a self servo-write circuit system 164, which forms the integrated circuit system of the invention and may be combined into a single integrated circuit. The self servo-write circuit system 164 (shown within the large broken line portion of FIG. 3) includes a servo write clock generator phase locked loop circuit 168. Each arrow shown in FIG. 3 denotes at least one electrical connection between devices or functions of the self servo-write circuit system 164 (also referred to herein as self-write circuit 164). The self-write circuit 164 is used by disc drive 100 for self-writing reference marks (also referred to herein as an "information field")(not shown) on the rotatable disc surface 106 (of FIG. 2). The reference marks written to the rotatable disc surface 106 (of FIG. 2) are normally servo fields (not shown) or clock fields (not shown) used by disc drive 100 to provide position and timing information regarding the heads 118 (of FIG. 2) relative position to the disc surface 106 (of FIG. 2) for writing of additional reference marks across the surface of the rotatable disc surface 106 (of FIG. 2) during a self-writing servo process.

Included within the self-write circuit 164 is a pulse detector circuit 170 (also referred to herein as a phase measurement circuit 170) used during the self-write servo process to create logic level signals from an information portion, typically clock fields, previously written to the disc surface 106 (of FIG. 2).

The logic level signals are used in determining the substantially accurate circumferential position of the information portion previously written to the disc surface 106 (of FIG. 2).

The phase measurement circuit 170 is used in the self-writing process to measure the phase or time difference between self-writing reference marks written to the disc surface 106 (of FIG. 2) at different times. The clock generator phase locked loop circuit 168, which includes a phase locked loop or PLL generates an accurate clock for writing additional reference marks based on detection and characteristics of the information portion previously written to the disc surface 106 (of FIG. 2). A programmable delay circuit 172 is used in conjunction with the phase measurement circuit 170 to perform track to track circumferential alignment of similar in kind reference marks, i.e., substantial alignment and coherence of servo fields to servo fields and clock fields to clock fields, for servo fields and clock fields written on adjacent data tracks 120 (of FIG. 1).

The programmable delay circuit 172 creates a delay or phase adjustable clock signal from a clock signal output of the clock generator phase locked loop circuit 168. The clock generator phase locked loop circuit 168 may be designed to multiply the frequency of the clock field bits while maintaining phase and time accuracy, and has a gated phase detector structure so that phase lock can be maintained with intermittent, missing, excluded or incomplete clock fields.

The phase measurement circuit 170 may be an analog or analog and digital mixed mode circuit. The clock generator phase locked loop circuit 168 may also be implemented as an analog and digital mixed mode circuit, such as a traditional analog phase locked loop, or as a digital or mostly digital circuit typically referred to as a digital phase locked loop. The programmable delay circuit 172 may be implemented as an analog circuit, or an analog and digital circuit, or as a purely digital circuit.

A pulse detector circuit 174, which may be either an analog or an analog and digital mixed mode circuit, functions similarly to a classical read-write channel integrated circuit pulse detector and is designed to have sufficient accuracy to assure timing alignment in phase and frequency between adjacent servo fields and between adjacent clock fields. A pattern generator 176 is a circuit functionally similar to pattern generator circuits used in heretofore traditional servo track writers. The digital circuits of the pattern generator 176 are selected to achieve substantial coherence (low jitter and skew) between information portion previously written to the disc surface 106 (of FIG. 2), either servo or clock fields, and a reference marks, either servo or clock fields, being written to the disc surface 106 during the self-write process. The programmable delay circuit 172 is used to adjust the phase or timing of the clock used to shift out the pattern from the pattern generator 176 during the self-write process. A multiplexer circuit 178 serves to switch the source of write signals between the pattern generator 176 and the normal read/write channel electronics (not shown) of the drive electronics 162.

A self-servo control and sequencing circuit 180 performs executive control functions of the self-writing process and forms timing signals required for the self-write process to proceed. The self-servo control and sequencing circuit 180 synchronizes timing signals to the clock signal generated by the clock generator phase locked loop circuit 168 and to a crystal clock (not shown) of the drive electronics 162. A buffer memory 182 is a digital circuit used for storage of radial position correction tables and intermediate values used during the self-write process. Switching the multiplexer circuit 178 to select signals from the pattern generator 176 enables the writing of servo field patterns and clock field patterns on the disk thereby allowing the self-write process to proceed.

In an alternate preferred embodiment programmable delay circuit 172 may be placed such that the delayed output clock is connected back to the input of the clock generator phase locked loop circuit 168. In that case programmable delay circuit 172 is included within the feedback loop of the PLL which may include the clock generator phase locked loop circuit 168. This feedback connection is advantageous by allowing the use of programmable delay circuit for measurement of the loop response characteristics of the clock generator phase locked loop circuit 168. In an another alternate preferred embodiment the programmable delay circuit 172 may be placed immediately following the pulse detector circuit 174, in which case the programmable delay circuit 172 will act upon the signals from the pulse detector circuit 174, which go to both the clock generator phase locked loop circuit 168 and phase measurement circuit 170.

Figure 4:
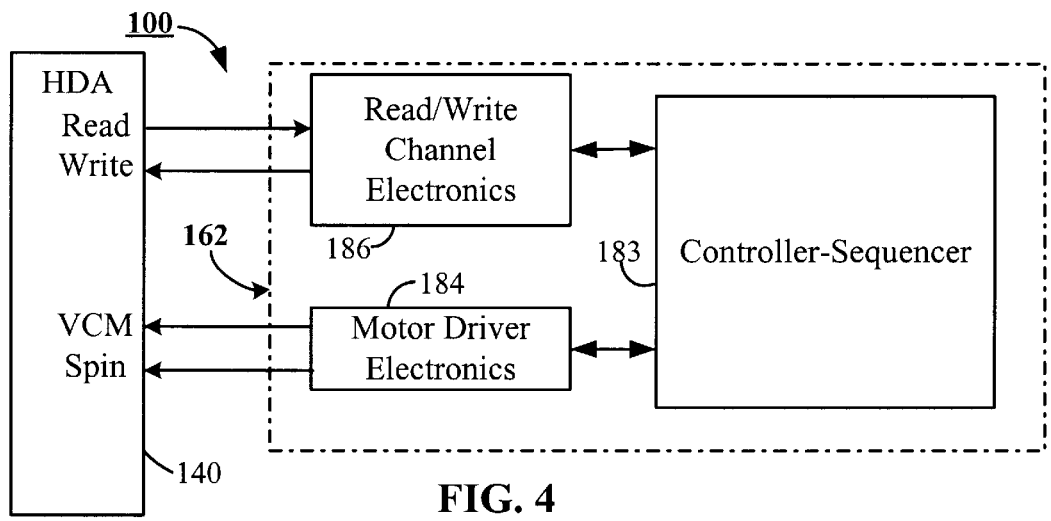
FIG. 4 is a simplified block diagram of the disc drive electronics portion of the electronic system of FIG. 3.

FIG. 4 is a simplified block diagram of the drive electronics 162, however not all of the circuitry present on the drive electronics 162 (of FIG. 3) is shown. In particular, the interface electronics involved with connecting the disc drive to a host system are not shown. The circuit systems shown are those involved with the self-write process. A controller-sequencer 183 is typically a digital circuit with a few analog elements such as an analog phase locked loop for producing a multiply clock signal from a lower frequency crystal and typically contains one or more programmable central processing units, as well as random access memory and program control memory. Motor driver electronics circuit 184 provides electrical power to the spindle motor assembly 104 (of FIG. 1) and the VCM 122 (of FIG. 2) during operations of the disc drive 100. The read/write channel electronics 186 executes either read or write functions during typical operations of the disc drive 100. During the self-write process of a preferred embodiment, the write portion of the read/write channel electronics 186 is switched out by multiplexer circuit 178 (of FIG. 3) in favor of the pattern generator circuit 176 (of FIG. 3), however the read portion of the read/write channel electronics 186 is used in conjunction with pulse detector circuit 174 (of FIG. 2) to read the reference marks previously written to the disc surface 106 (of FIG. 2).

Figure 5:
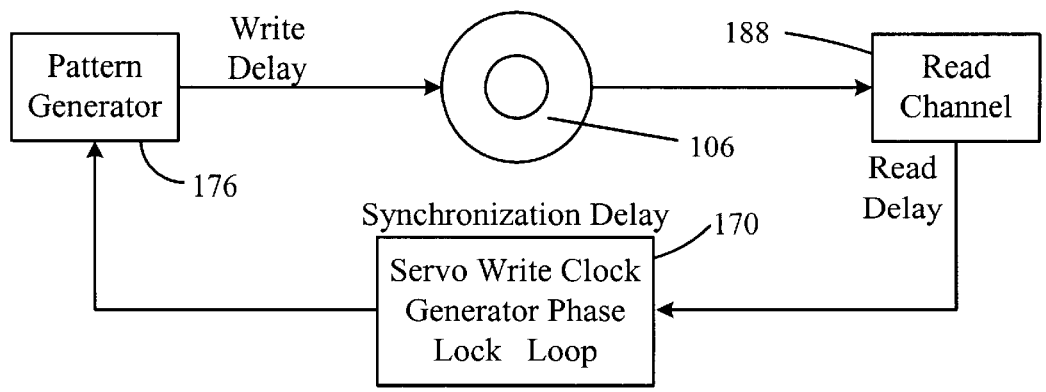
FIG. 5 is a simplified block diagram of delay paths of the read/write electronics of the electronic control system of FIG. 3.

FIG. 5 shows a block diagram representing the delays in the pattern generator 176, the read channel portion 188 of read/write channel electronics 186 and the clock generator phase locked loop circuit 168 which cause read back information to be shifted in phase relative to the reference mark write signals the self-write process uses to write the additional write signals to the disc surface 106. The design of the servo write clock generator phase lock loop system 168 and programmable delay 172 compensates for these phase offsets so that the reference marks written to the disc surface 106 are placed coherent to the reference marks previously written to the disc surface 106.

Figure 6:
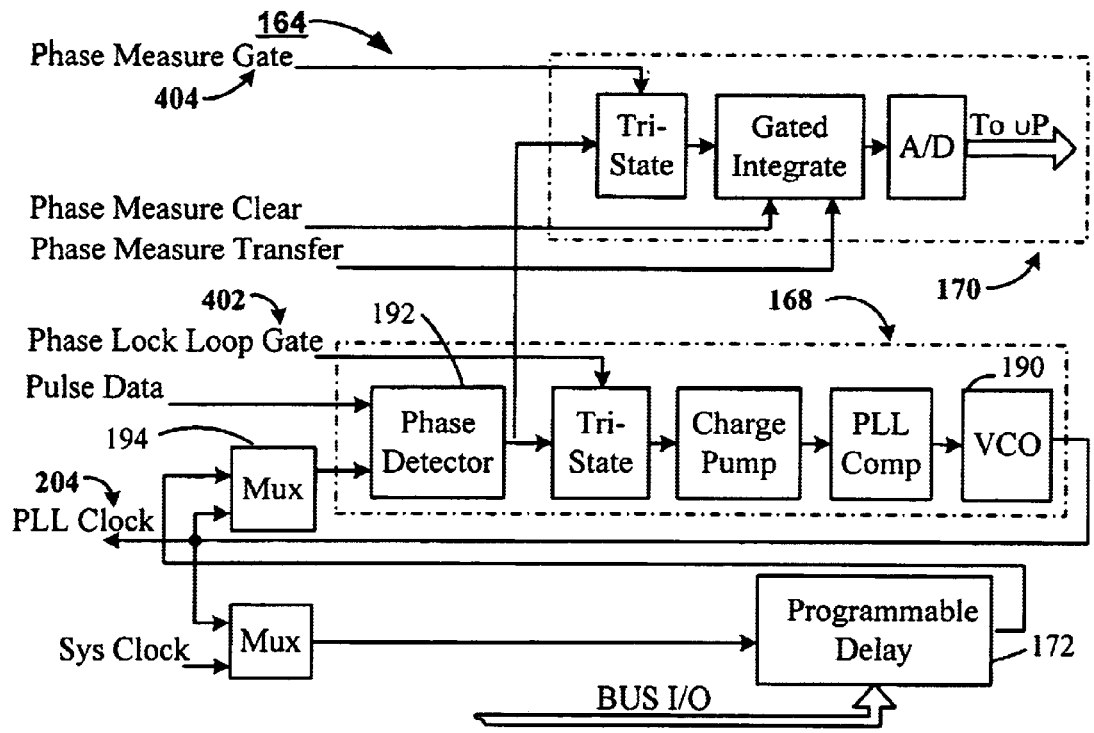
FIG. 6 is a block diagram of a servo write phase lock loop system portion of the circuitry of FIG. 3 which facilitates self-writing of information to the disc drive of FIG. 1.

The self-write circuit 164 of FIG. 6 has the ability to measure phase error between a voltage controlled oscillator 190 and reference marks previously written to the disc surface 106 (of FIG. 5), the ability to accurately delay a phase lock loop clock portion of the self-write circuit 164 and the ability of multiplexing clock signals into the phase detector circuit 192 in order to perform automated circuit/system calibrations. Measurement of phase error is accomplished by a phase measurement circuit 170 of the self-write circuit 164. The ability to delay a clock signal of the servo write clock generator phase locked loop circuit 168 is provided by programmable delay circuit 172 and the ability of multiplexing, or switching, clock signals into the phase detector circuit 192 is provided by a multiplexer 194.

Figure 7:
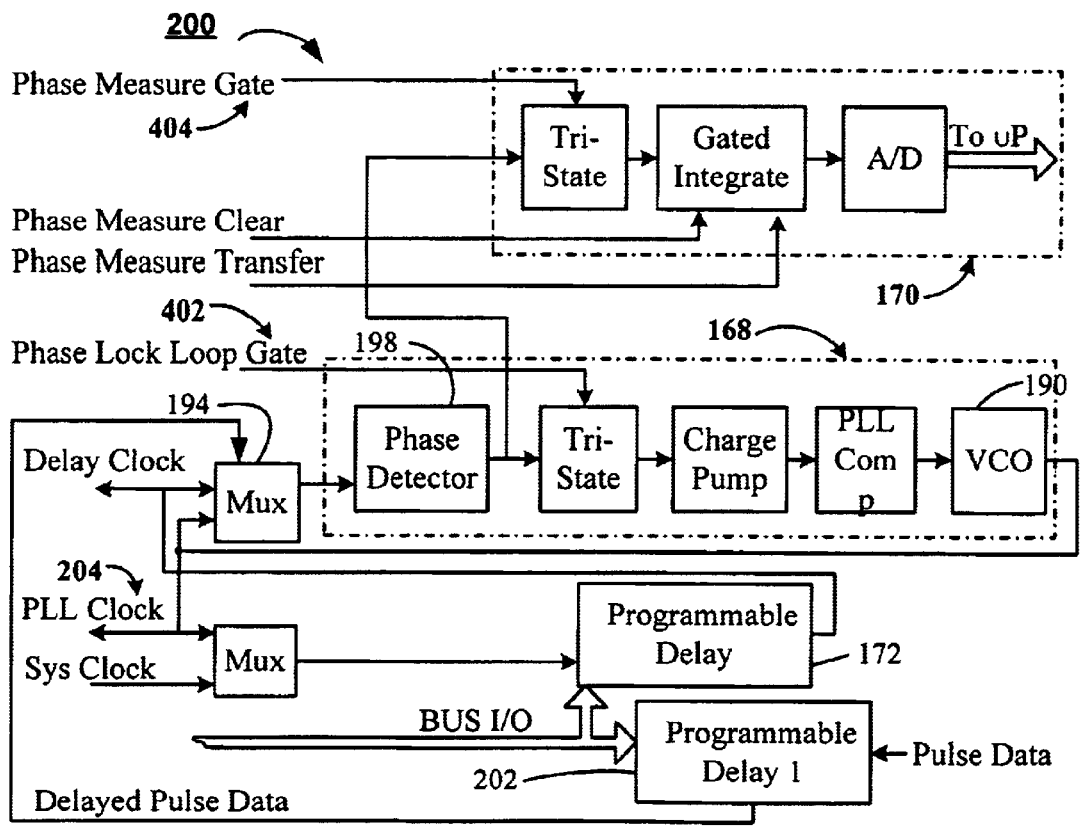
FIG. 7 is a block diagram of an alternate embodiment of a servo write phase locked loop system portion of the circuitry of FIG. 3, which facilitates self-writing of information to the disc drive of FIG. 1.

FIG. 7 shows a block diagram of a servo write phase lock loop system 200 which is an alternate embodiment of the self-write circuit 164 (of FIG. 5). Servo write phase lock loop system 200 includes an additional programmable delay circuit 202, which provides a delayed pulse data signal to the multiplexer 194 used to switch clock signals into the phase detector circuit 198. Also shown by FIG. 7 is a locked phase lock loop clock signal 204 as an output of the phase lock loop clock portion 170.

Figure 8:
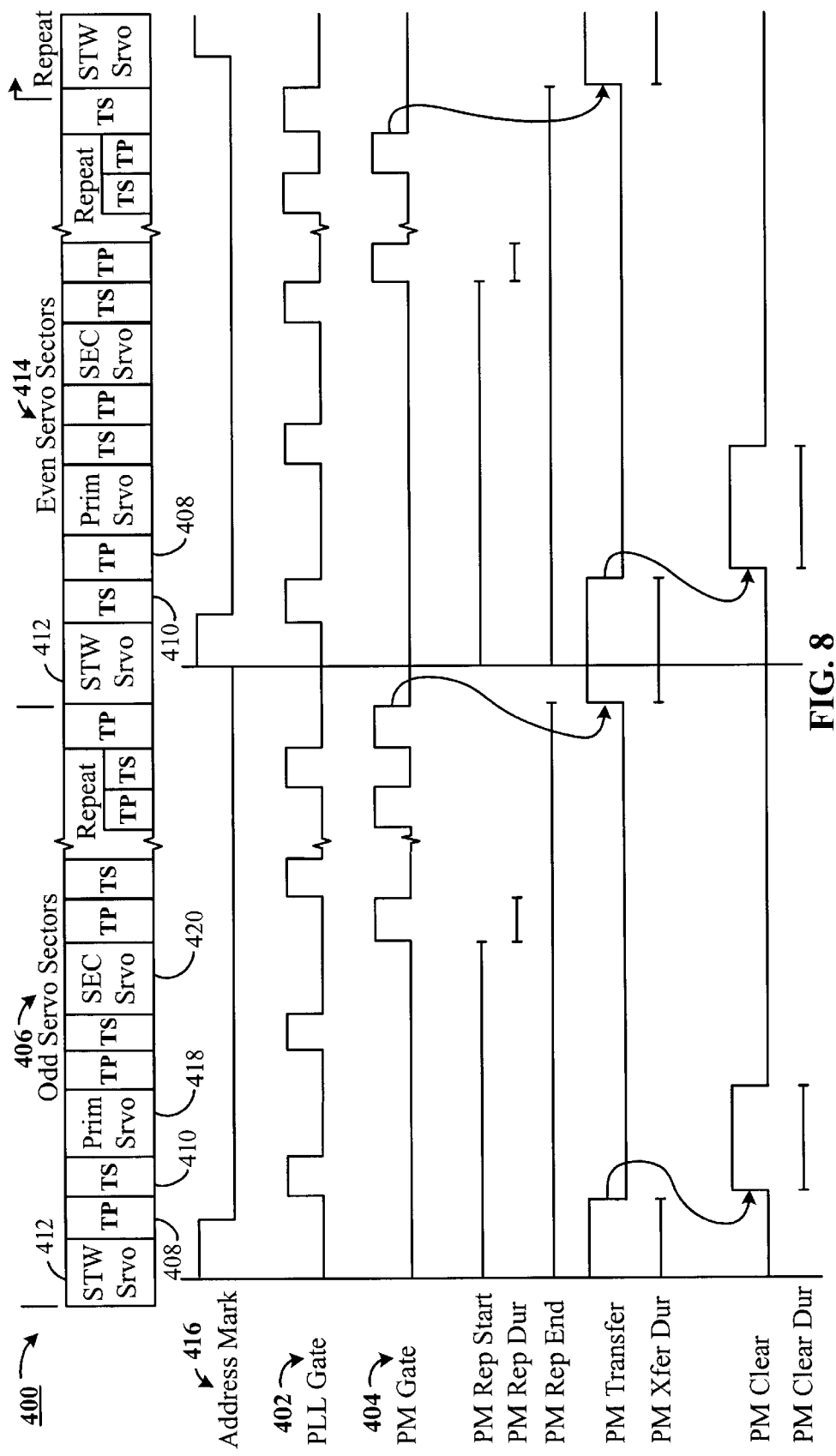
FIG. 8 is a timing diagram of the servo write phase lock loop system of FIG. 6.

FIG. 8 shows a timing chart 400 for the clock generator phase locked loop and phase measurement circuits 168 and 170 (of FIGS. 6 and 7) of self-write circuit 164 (of FIG. 3). System timing and phase error measurement is derived from gates, which are provided from digital logic synchronous to self servo control and sequencing circuit 180 (of FIG. 3). In order to establish phase lock of the PLL and to measure phase error, phase locked loop gate 402 (also referred to as PLL gate 402) is used to drive the servo write clock generator phase locked loop circuit 168 (of FIG. 7) and phase measure gate 404 (also referred to as PM gate 404) is used to drive the phase measurement circuit 170 (of FIG. 6 or 7) of the self-write circuit 164 (of FIG. 3). For each of an odd servo sector 406, a first reference mark or primary self-writing timing field 408 (also referred to herein as a "primary clock field" 408) precedes a second reference mark or secondary self-writing timing field 410 (also referred to herein as a "secondary clock field" 410) and may follow a third reference mark or servo track writer supplied servo field 412. For each of an even servo sector 414, the secondary self-writing timing field 410 precedes the primary self-writing timing field 408 and may follow a servo track writer supplied field 412. For purposes of this disclosure it is noted that each servo sector, either odd 406 or even 414, written to a data track 120 (of FIG. 1) lie substantially between a successive forth type of reference mark designated as address marks 416.

Included within each odd servo sector 406 is the primary self-write timing field 408, followed by the secondary self-writing timing field 410, followed by a fifth type reference mark or primary servo field 418, which is followed by a second primary self-writing timing field 408, and a second secondary self-writing timing field 410 which proceeds a sixth type of reference mark or secondary self-writing servo field 420. Following the secondary self-writing servo field 420 a repetitive series of a paired timing field, i.e., a primary followed by a secondary self-write timing field (408, 410), fill the balance of the data track 120 (of FIG. 1) between the address marks 416. It is to be understood that differing arrangements of timing fields and servo fields can be undertaken and would be within the scope of this invention, the objective being an alternating set of primary and secondary timing fields and servo fields.

These repetitive series of timing field pairs (also referred to as clock field pairs) are used by the phase measurement circuit 170 (of FIG. 6 or 7) of the self-write circuit 164 (of FIG. 3) as the basis for measuring phase error between reference marks (whether primary or secondary self-writing timing fields [408 or 410], or primary or secondary self-writing servo fields [418 or 420]) previously written to the rotatable disc surface 106 (of FIG. 5) and reference marks to be written to the rotatable disc surface 106 (of FIG. 5) time coherent and phase and frequency with the previously written marks. In general, for odd servo sectors, the phase measurement gate 404 responds to the first primary self-writing timing field 408 following the secondary self-writing servo field 420 by activating the phase measurement circuit 170 (of FIG. 7) to proceed with measurements for us in calculating phase error. The time duration for each measurement is substantially the same as the sum of the time that phase measure gate 404 is high for all primary self-writing timing fields 408 between successive address marks of the selected data track 120 (of FIG. 1) for which the phase measurement calculations are being made. The phase measurement portion of the self-write process concludes, for each odd servo sector 406 of the selected track 120 (of FIG. 1) with the occurrence of the final primary self-writing timing field within the subject servo sector 406.

Conclusion of the phase measurement portion of the self-write process initiates transfer of the measurements through the self servo control and sequencing circuit 180 (of FIG. 3) to servo engine 148 and control processor 144 (of FIG. 2). Following transfer of the measurements to servo engine 148 and control processor 144 (of FIG. 2), the phase measurement circuit 170 (of FIG. 6 or 7) of self-write circuit 164 (of FIG. 3) is cleared in preparation for subsequent sequential phase measurements of all remaining servo sectors of the selected data track 120 (of FIG. 1). It should be noted that phase measurement data collected to calculate phase error is gathered from the repeating pairs of primary and secondary self-writing timing fields (408 and 410) portion of each servo sector. Because the phase error measurements are taken on the repeating pairs of self-writing timing fields, writing additional self-writing timing fields coherent with previously written self-writing timing fields is an important element in the successful implementation of the self-write process disclosed herein.

Figure 9:
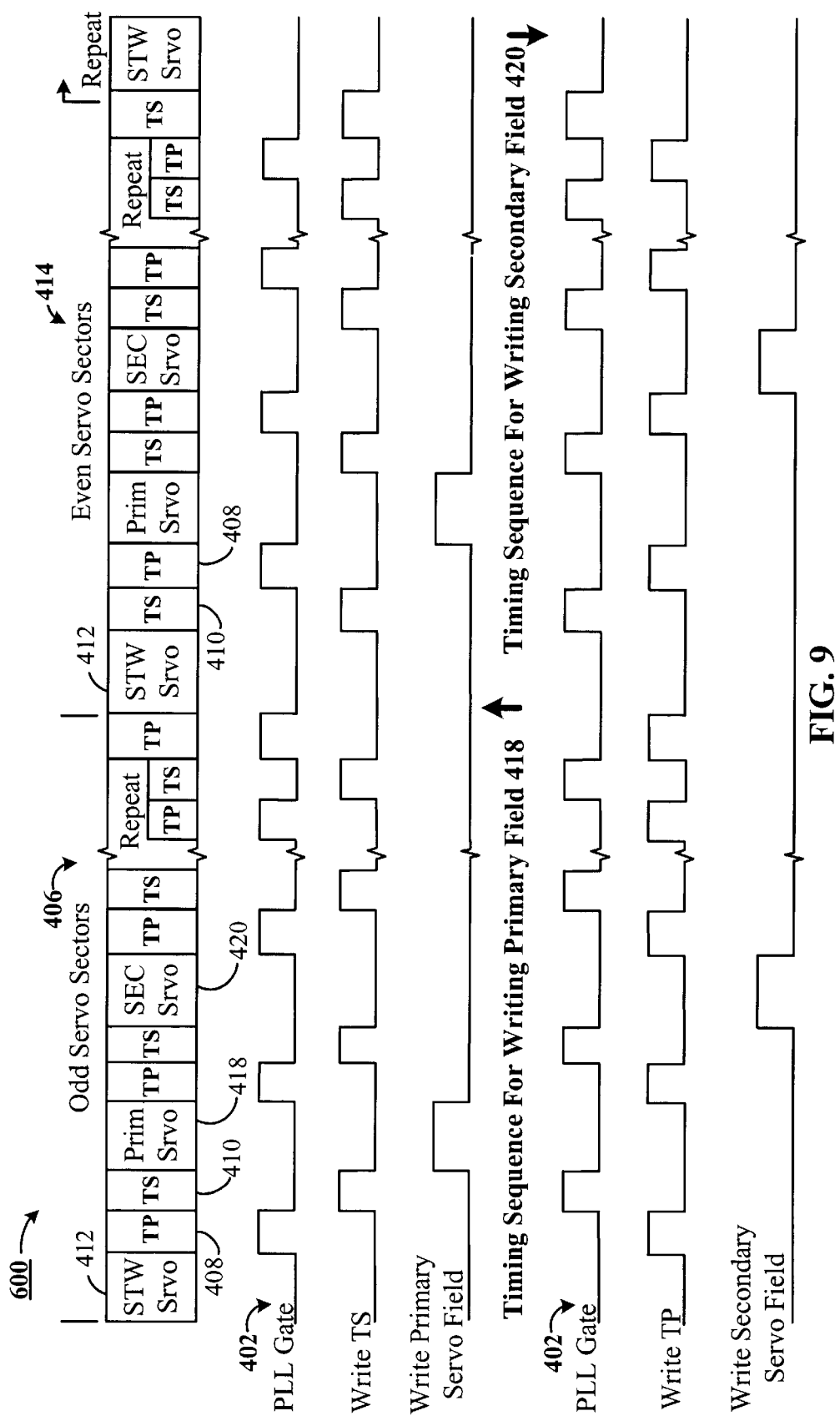
FIG. 9 is a timing diagram of a phase measurement portion of the servo write phase lock loop system of FIG. 6.

FIG. 9 shows timing sequence chart 600 used by the self-write circuit 164 (of FIG. 3) for writing reference marks to a selected data track 120 (of FIG. 1) that are phase and frequency coherent with reference marks previously written to the data track 120 (of FIG. 1). Shown by the upper portion of the timing sequence charts 600, the primary servo field 418 reference marks and the secondary self-writing timing field 420 reference marks are each written to selected data track 120 (of FIG. 1) when the servo write clock generator phase locked loop circuit 168 (of FIG. 5, 6 or 7) of self-writing circuit 164 (of FIG. 3) is synchronized and locked to primary self-writing timing fields 408. (of FIG. 8 or 9).

The lower portion of the timing sequence charts 600 shows that the secondary servo field 420 reference marks and primary self-writing timing fields 408 (of FIG. 8) are each written to selected track 120 (of FIG. 1) when the servo write clock generator phase locked loop circuit 168 (of FIG. 5, 6 or 7) of self-write circuit 164 (of FIG. 3) is synchronized and locked to the secondary self-writing timing field 410 (of FIG. 8).

In other words, viewing FIG. 8 and FIG. 9 together, information is written to a selected portion of selected data track 120 (of FIG. 1) while the servo write clock generator phase locked loop circuit 168 (of FIGS. 5, 6 and 7) of self-write circuit 164 (of FIG. 3) is locked. Following the write operation, and with the servo write clock generator phase locked loop circuit 168 (of FIG. 5) of self-write circuit 164 (of FIG. 3) still locked, the phase measurement circuit 170 (of FIG. 6) is used to identify the amount of phase offset between servo write clock generator phase locked loop circuit 168 (of FIG. 5) of self-write circuit 164 (of FIG. 3) and the reference marks just previously written to the rotatable disc surface 106. An appropriate compensating offset is then programmed into programmable delay 172 (of FIG. 6 or 7), this compensating offset is then used to remove the phase difference between the read channel 188 (of FIG. 5) and the pattern generator 176 (of FIG. 3) on the next writing operation.

Figure 10:
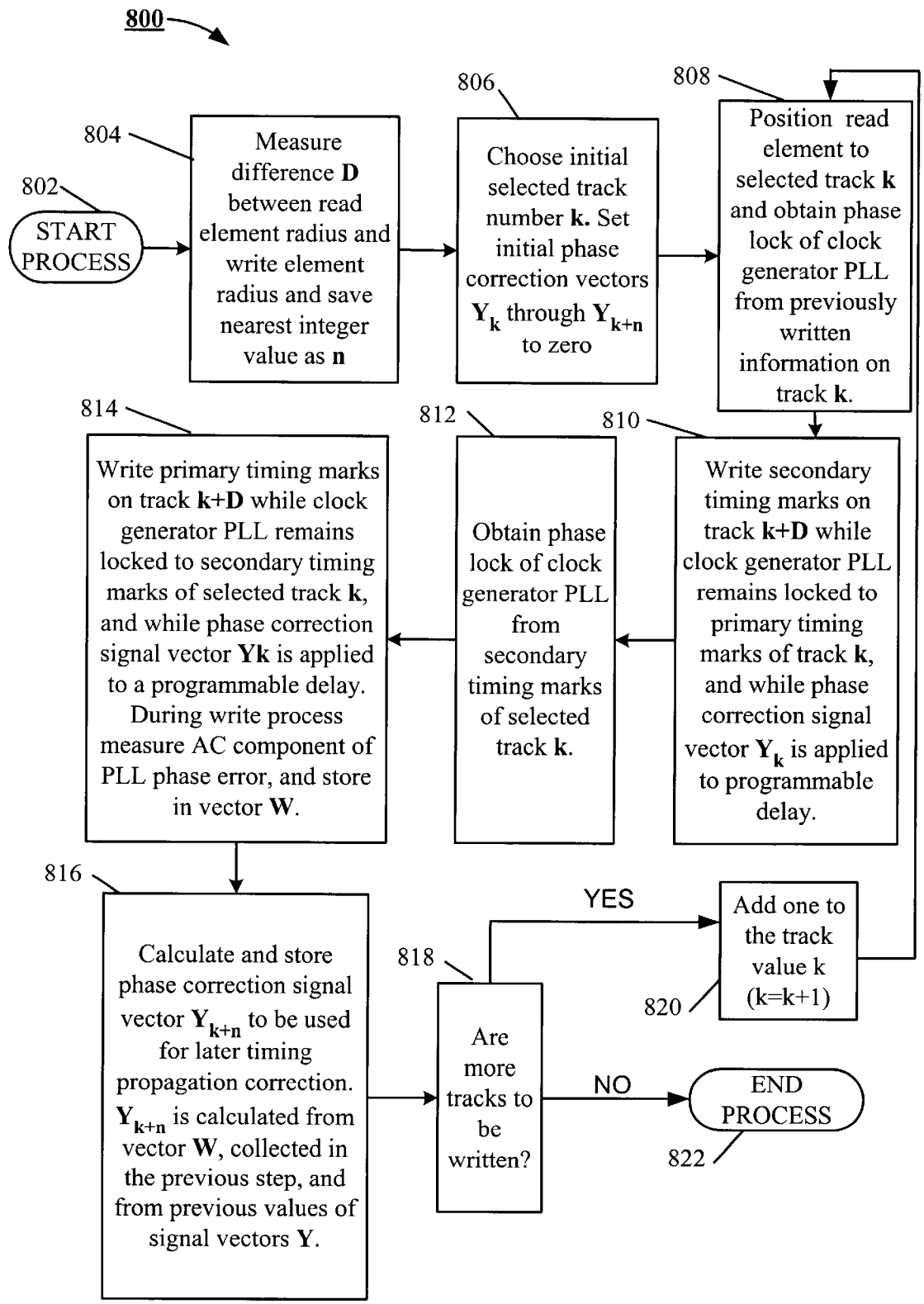
FIG. 10 is a flow chart of a method of self-writing a servo or clock field to a rotatable disc surface of the disc drive of FIG. 1.

FIG. 10 shows self-write process 800, a method of writing an information field (such as 408, 410, 418 or 420) to a rotatable disc surface (such as 106), aligned in time and coherent in phase and frequency with a previously written information field (such has 408, 410, 418 or 420) written to the rotatable disc surface of a disc drive (such as 100), starting at process step 802. From process step 802 the self-write process continues in process step 804 by measuring the difference D of a read element radius and write element radius of a read/write head (such as 118) of the disk drive relative to a center of the rotatable disk. The nearest integer portion of this difference is then save as a value n. Self-write process continues at process step 806 by choosing a track number of a data track (such as 120) at which timing propagation will start and storing this number as a track value k. Also at process step 806 an initial phase correction signal vector $Y_k$ corresponding to track k is set to zero ($Y_k$=0), and additional phase correction signal vectors from $Y_{k+1}$, $Y_{k+2}$, to $Y_{k+n}$, corresponding to tracks from k to k+n, are all set to zero. The self write process continues at step 808 where the read element is position to a selected track k and phase lock of a servo write clock generator phase locked loop circuit (such as 168) is obtained by reading the previously written information, either clock fields or servo fields, on track k and the phase correction signal vector $Y_k$ is determined based on the previously written information.

In step 810 the self write process continues by writing a respective set of secondary timing marks on track k+D while the servo write clock generator phase locked loop circuit remains locked to the primary timing marks of track k, and while phase correction signal vector $Y_k$ is applied to a programmable delay (such as 172). It is worth remembering at this point, that the track k+D being written in step 810 is offset from selected track k by read element to write element radial offset distance D. By the process in step, 810 the information fields including secondary timing marks 410 and primary servo marks 418 are written aligned in time and coherent in phase and frequency with the previously written information fields that include primary timing marks 408 and 410 previously written to the rotatable disc surface.

Now the self-write process continues to step 812 where the servo write clock generator phase locked loop circuit is obtained from the secondary timing marks of selected track k.

In step 814 the self write process continues again by writing the primary timing marks on track k+D while the servo write clock generator phase locked loop circuit remains locked to the secondary timing marks of track k, and while phase correction signal vector $Y_k$ is applied to programmable delay. It is again worth remembering that, the track k+D being written in step 814 is offset from selected track k (120 of FIG. 1) by the read element to write element radial offset distance D. By the process in step 814 the information fields comprised of primary timing marks 408 and secondary servo marks 420 are written aligned in time and coherent in phase and frequency with the information fields comprised of the secondary timing marks 410 previously written to the rotatable disc surface. Also during the writing process of self-write step 814, an AC component of the PLL phase error is measured by a phase measurement circuit (such as 170) and stored temporarily in a vector W. The measurement of this AC component of the PLL phase error is significant to the process of preserving the time alignment and coherence of data to be written later with data written previously.

Now the self-write process proceeds to step 816 where a phase correction signal vector $Y_{k+n}$ is calculated and then stored to be used for later timing propagation correction so that the time alignment and frequency and phase coherence of data to be written is maintained relative to previously written data. This signal vector, $Y_{k+n}$, is calculated from the AC component of the PLL phase error stored in vector W, collected in the previous step, and from previous values of signal vectors $Y_k$. Later, as the propagation process continues, when the read head is eventually placed over selected track k+n this stored phase correction signal vector is used as a correction vector applied to programmable delay. Next, at step 818 a determination is made whether any more tracks are to be written. If more tracks are to be written the self write process proceeds to process step 820, where a one is added to the track value k (k=k+1), and the process returns to process step 808 and continues to loop through the process until no tracks remain to be written, at which point the self write process ends the process at process step 822.

In a preferred embodiment a disc drive (such as 100) has a rotatable disc surface (such as 106) and a positioning mechanism, which includes a head stack assembly (such as 110) and a voice coil motor (such as 122), controlling a positionable read/write head (such as 118) relative to the rotatable disc surface. The disc drive includes a write channel portion of a read/write channel electronics circuit (such as 186), for writing data to the rotatable disc surface, self-write circuit (such as 164) with a servo write clock generator phase locked loop circuit (such as 168) for controlling timing for writing a reference mark (such as 408, 410, 412 or 420) to the rotatable disc surface, a pulse detector circuit (such as 174) for creating logic level signals from information (such as 408, 410, 412 or 420) previously written to the rotatable disc surface, a pattern generator (such as 176) for generating reference mark write signals from the logic level signals for use in writing the reference mark to the rotatable disc surface, and a multiplexer (such as 178) for switching between write signals of the write channel and reference mark write signals from the pattern generator, which are used for writing the data and the reference mark respectively to the rotatable disc surface of the disc drive.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art such as, the inclusion of the pulse detector circuit 174 (of FIG. 6), the phase measurement circuit 170 (of FIG. 3), servo write clock generator phase locked loop circuit 168 (of FIG. 3), the programmable delay circuit 172 (of FIG. 3), the pattern generator circuit 176 (of FIG. 5), the multiplexer circuit 178 (of FIG. 3), and buffer memory 182 (of FIG. 3) within the read/write channel electronics 186 (of FIG. 4) of disc drive 100 (of FIG. 1) or the inclusion of the self-servo control and sequencing circuit 180 (of FIG. 3) and/or the inclusion of the phase measurement circuit 170 (of FIG. 3) and the pattern generator circuit 176 (of FIG. 5) within the control-sequencer 183 (of FIG. 4) of the disc drive 100 (of FIG. 1), which are encompassed in the spirit of the invention disclosed and as defined in the appended claims. And, although preferred embodiments have been depicted and described in detail herein, modification, additions, substitutions and the like can be made by those skilled in the relevant art without deviating from the spirit of the invention and are therefore considered to be within the scope of the invention as defined in the appended claim. For claims expressed in mean-plus-function format, prior art cited in this specification is excluded as equivalent art.

What is claimed is:

1. A data storage device comprising:

a pattern generator which generates servo write signals used by a data transducing head to write reference marks to a recording medium comprising a clock field having a timing pattern at a selected frequency and a servo field having a positional pattern used to position the head;

a servo write clock generator which generates a write clock for said write signals;

a phase measurement circuit which measures a time offset between the servo write clock generator and at least a portion of a previously written reference mark on the medium; and a self-servo control and sequencing circuit which synchronizes operation of the pattern generator in relation to the measured time offset to successively write the reference marks to respective tracks on the medium so that the respective clock fields and servo fields on said tracks are nominally aligned in time and nominally coherent in phase and frequency.

2. The data storage device of claim 1 further comprising: a memory buffer for storing radial position correction tables and values for writing the reference marks to said tracks.

3. The data storage device of claim 1 wherein the reference marks are written to a second track while being read from a first track.

4. The data storage device of claim 1 further comprising a programmable delay circuit interposed between the servo write clock generator and the pattern generator which applies a programmable delay to the write clock in relation to the measured time offset.

5. The data storage device of claim 1 further comprising a pulse detector which provides a detection signal to the servo write clock generator in relation to the at least a portion of a previously written reference mark.

6. The data storage device of claim 5 further comprising a programmable delay circuit interposed between the pulse detector and the servo write clock generator which applies a programmable delay to the detection signal.

7. The data storage device of claim 1 further comprising a multiplexer and a write channel circuit configured to provide data write signals to the head to write data to the recordable medium, the multiplexer configured to direct the servo write signals to the head during a servo self-writing operation and to direct the data write signals to the head during normal data transfer operation of the data storage device.

8. The data storage device of claim 1 wherein the respective tracks comprise tracks that extend from an innermost radius to an outermost radius of the recording medium.

9. The data storage device of claim 1 wherein the head comprises separate read and write elements, and wherein the read element reads the at least a portion of the previously written reference mark from a first track while the write element writes the reference marks to a second track.

10. A method for self-servo writing in a data storage device, comprising:

using a data transducing head to write reference marks to a track on a rotating recording medium comprising a clock field having a timing pattern at a selected frequency and a servo field having a positional pattern used to position the head;

measuring a time offset between a write clock generated by a servo write clock generator and at least a portion of said reference marks written during the writing step; and applying a servo write signal to the head to write the reference marks to a second track on the recording medium, wherein the servo write signal is delayed in relation to the measured phase offset so that the respective clock fields and servo fields on said first and second tracks are nominally aligned in time and nominally coherent in phase and frequency.

11. The method of claim 10 wherein the applying step further comprises storing radial position correction tables and values for writing the reference marks to the second track.

12. The method of claim 10 wherein the applying step comprises directing a programmable delay to the write clock in relation to the measured time offset.

13. The method of claim 10 further comprising employing a pulse detector to detect the at least a portion of said reference marks.

14. The method of claim 13 wherein the employing step further comprises applying a programmable delay to an output of the pulse detector.

15. The method of claim 10 further comprising providing a multiplexer and a write channel circuit configured to provide data write signals to the head to write data to the recordable medium, the multiplexer configured to direct the servo write signals to the head during a servo self-writing operation and to direct the data write signals to the head during normal data transfer operation of the data storage device.

16. The method of claim 10 comprising a subsequent step of repeating the using, measuring and applying steps to write a plurality of concentric tracks that extend from an innermost radius to an outermost radius of the recording medium.

17. The method of claim 10 wherein the head of the using and applying steps is characterized as comprising separate read and write elements, and wherein the applying step comprises using the read element to read the at least a portion of the reference marks from the first track while using the write element to write the reference marks to the second track.

* * * * *